United States Patent
Braun et al.

(10) Patent No.: US 9,527,480 B2
(45) Date of Patent: Dec. 27, 2016

(54) CONTROL DEVICE AND CONTROL METHOD FOR THE DRIVE UNIT OF A WINDSHIELD WIPER SYSTEM

(71) Applicant: Robert Bosch GmbH, Stuttgart (DE)

(72) Inventors: Peter Braun, Buehlertal (DE); Norbert Wegner, Buehl (DE); Harald Retsch, Rheinau (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 14/597,797

(22) Filed: Jan. 15, 2015

(65) Prior Publication Data
US 2015/0127219 A1 May 7, 2015

Related U.S. Application Data

(63) Continuation of application No. 13/512,209, filed as application No. PCT/EP2010/064877 on Oct. 6, 2010, now Pat. No. 8,963,464.

(30) Foreign Application Priority Data

Nov. 27, 2009 (DE) ........................ 10 2009 047 211

(51) Int. Cl.
*H02P 7/00* (2016.01)
*B60S 1/08* (2006.01)

(52) U.S. Cl.
CPC ............ *B60S 1/0896* (2013.01); *B60S 1/0814* (2013.01); *B60S 1/0859* (2013.01)

(58) Field of Classification Search
CPC ...... B60S 1/0896; B60S 1/0814; B60S 1/0818
USPC ....... 318/453, 443, 444, 483, 466, 461, 396, 318/369, 286, 128, 468, 46, 470, 471; 701/36, 49; 74/437, 98
See application file for complete search history.

(56) References Cited

U.S. PATENT DOCUMENTS

| | | | | |
|---|---|---|---|---|
| 2,851,649 A | * | 9/1958 | Sullivan | B60S 1/08 318/275 |
| 3,774,091 A | * | 11/1973 | Kearns | B60S 1/0807 318/380 |
| 4,317,073 A | | 2/1982 | Blaszkowski | |
| 4,543,839 A | * | 10/1985 | Buchanan, Jr. | B60S 1/16 74/437 |

(Continued)

FOREIGN PATENT DOCUMENTS

| | | | | |
|---|---|---|---|---|
| DE | 4330112 | * | 3/1995 | ............... B60S 1/08 |
| DE | 10235024 | | 4/2003 | |

(Continued)

OTHER PUBLICATIONS

PCT/EP2010/064877 International Search Report dated Dec. 27, 2010 (Translation and Original, 6 pages).

*Primary Examiner* — Rita Leykin
(74) *Attorney, Agent, or Firm* — Michael Best & Friedrich LLP

(57) ABSTRACT

The invention relates to a control device (160) for a drive unit (120) of a vehicle windshield wiper system (100) comprising at least one wiper arm (140). The control device (160) is designed to determine a load quantity (L) of the drive unit (120) and to set the wiping frequency (WH) of the wiper arm (140) on the basis of the ratio of the load quantity (L) to at least one load threshold value (LS). Furthermore, the control device (160) is designed to set the wiping frequency (WH) depending on the current speed (v) of the vehicle.

12 Claims, 5 Drawing Sheets

(56) References Cited

U.S. PATENT DOCUMENTS

| | | | | |
|---|---|---|---|---|
| 4,663,575 A * | 5/1987 | Juzswik | ................ | B60S 1/0807 15/250.17 |
| 4,866,357 A * | 9/1989 | Miller | ................ | B60S 1/08 318/443 |
| 5,291,109 A * | 3/1994 | Peter | ................ | B60S 1/08 318/268 |
| 5,453,670 A | 9/1995 | Schaefer | | |
| 5,508,595 A | 4/1996 | Schaefer | | |
| 5,822,827 A * | 10/1998 | Dimatteo | ................ | B60S 1/3411 15/250.203 |
| 5,982,123 A * | 11/1999 | Hornung | ................ | B60S 1/0807 318/266 |
| 6,150,783 A * | 11/2000 | Michenfelder | ................ | B60S 1/08 15/250.13 |
| 6,236,180 B1 | 5/2001 | Contos et al. | | |
| 6,634,225 B1 * | 10/2003 | Reime | ................ | B60S 1/0837 340/602 |
| 6,861,636 B2 * | 3/2005 | Ockerse | ................ | B60S 1/0818 250/208.1 |
| 6,888,465 B2 * | 5/2005 | Schmitt | ................ | B60H 1/00785 318/483 |
| 6,936,985 B2 * | 8/2005 | Pankey | ................ | B60S 1/0818 15/250.02 |
| 7,009,355 B2 * | 3/2006 | Heo | ................ | B60S 1/0818 318/445 |
| 7,019,275 B2 | 3/2006 | Stam et al. | | |
| 7,079,925 B2 | 7/2006 | Kubota et al. | | |
| 7,095,199 B2 * | 8/2006 | Hirose | ................ | B60S 1/0818 318/2 |
| 7,296,461 B2 * | 11/2007 | Barguirdjian | ................ | B32B 17/10036 73/73 |
| 7,696,710 B2 * | 4/2010 | Byrne | ................ | B60S 1/0822 318/444 |
| 8,347,448 B2 * | 1/2013 | Natsume | ................ | B60S 1/08 15/250.17 |
| 9,048,763 B2 * | 6/2015 | Bonnefous | ................ | B60S 1/08 |
| 2004/0225416 A1 | 11/2004 | Kubota et al. | | |
| 2009/0282636 A1 * | 11/2009 | Braun | ................ | B60S 1/08 15/250.12 |

FOREIGN PATENT DOCUMENTS

| | | | | |
|---|---|---|---|---|
| DE | 10246433 | * | 7/2003 | ................ B60S 1/08 |
| DE | 102008011229 | * | 11/2008 | ................ B60S 1/08 |
| WO | 2008138808 | | 11/2008 | |

* cited by examiner

CONTROL DEVICE AND CONTROL METHOD FOR THE DRIVE UNIT OF A WINDSHIELD WIPER SYSTEM

RELATED APPLICATION

The present application is a continuation of co-pending U.S. patent application Ser. No. 13/512,209, filed on Jun. 26, 2012, which is a U.S. National Phase application of International Patent Application No. PCT/EP2010/064877, filed Oct. 6, 2010 and claims priority to German Patent Application No. DE 102009047211.8, filed Nov. 27, 2009, priority is claimed to each of the above applications, and the entire content of each application is hereby incorporated by reference.

BACKGROUND

The invention relates to a control device for a drive unit of a windshield wiper system, in particular a windshield wiper system for a motor vehicle. In addition, the invention relates to a method for controlling such a drive unit and to the corresponding windshield wiper system.

Windshield wipers are used in various types of vehicles, including as front and rear windshield wipers in motor vehicles. Typical windshield wiper systems include one or more wiper arms provided with wiper blades which are moved cyclically over the windshield to be cleaned in order to wipe moisture from the windshield. An electronically controlled electric motor, typically a rotating motor, whose movement is converted either directly or via a corresponding transmission into the desired wiping movement, acts as drive for a wiper arm. In this case, the motor needs to apply torques of different levels, depending on the operating situation, in order to move the wiper arm at the desired wiping speed over the windshield. In particular the wiping operation on a dry windshield represents a relatively high load on the motor owing to the high frictional forces acting in the process between the windshield surface and the wiper blade. Since a power which needs to be applied by the drive unit is in principle associated with an energy input in the drive unit and a thermal load on the motor component resulting therefrom, windshield wiper motors are generally equipped with special protective functions, which disconnect the motor in the event that a critical temperature is exceeded. As a result of the temperature rise in the motor, the maximum torque of said motor also decreases measurably. In order to ensure that the desired torque and therefore also the windshield wiper function as such is available in any operating situation, the peak loads on the motor which realistically occur during windshield wiper operation needs to be taken into consideration in the dimensioning of the drive unit. Thus, for example, motors with a higher power than is necessary need to be used in order to ensure possibly also relatively long operation on a dry windshield, where possible without activation of the motor protection function. However, the desire for a high-power windshield wiper drive clashes with the aim of making vehicle components such as the windshield wiper motor as compact and light as possible in order to make effective use of the space available in the vehicle and at the same time to be able to reduce the weight of the vehicle.

DE 102006061679 A1 has disclosed a device for driving a drive unit of a wiper system which has a protective function against thermal shutdown of the drive unit. In order to avoid shutdown, the wiping frequency of the windshield wiper is set depending on a load variable, which is dependent on the torque to be applied by the drive unit during wiping. In this case, the wiping frequency is reduced as soon as the load variable exceeds a predetermined first threshold value. Correspondingly, the wiping frequency is increased again as soon as the load variable falls below a predetermined second threshold value.

SUMMARY

The object of the invention is to provide improved driving of the drive unit of a windshield wiper system which provides the possibility of a further reduction in the load-dependent motor heating, and associated therewith, a further increase in the availability of the full motor power. This object is achieved by a control device for a drive unit of a windshield wiper.

The invention provides a control device for controlling a drive unit for at least one wiper arm of a vehicle windshield wiper system, the control device being designed to determine at least one load variable of the drive unit and to set the wiping frequency of the wiper arm on the basis of the ratio of the determined load variable to at least one load threshold value. In this case, in addition, the control device is designed to perform the setting of the wiping frequency depending on the present traveling velocity of the vehicle. By taking into consideration the present traveling velocity, aerodynamic effects in the wiper arm loading, i.e. the additional loading on the wiper motor caused by the airstream, come into play. In particular, with the aid of the control device according to the invention, the energy input caused by the wind load in the drive unit can be reduced and thus failure of this drive unit caused by excessively high thermal loading is prevented. As a result of this, smaller wiper motors can be used for the same task without the performance and the availability of the wiper motor being restricted. The smaller physical size of the wiper motor brings about a reduction in the weight of this component. Owing to the savings made on materials, it is also possible to reduce manufacturing costs.

One embodiment of the invention provides that the control device is designed to determine the load threshold value depending on the wind load acting on the wiper arm at the present traveling velocity. Since the wind load has an approximately quadratic association with the traveling velocity, by taking into consideration the wind load acting on the wiper arm a more accurate conclusion can be drawn on the total load state of the wiper motor precisely at relatively high velocities.

In accordance with a further embodiment of the invention, the control device is designed to increase the load threshold value, in the event of an increase in the traveling velocity, by a magnitude which corresponds substantially to the increase in the wind load acting on the wiper arm brought about by the increase in traveling velocity. Since the wind load represents a velocity-dependent component of the total load of the wiper motor, the two operating ranges of the windshield wiper, namely "wiping operation on wet windshield" and "wiping operation on dry windshield" also demonstrate a following profile corresponding to the wind load. It is therefore expedient to configure the profile of the load threshold value indicating the transition between the two operating ranges to be correspondingly dependent on the wind load.

A further embodiment envisages that the control device is designed to implement the velocity-dependent matching of the load threshold value only at relatively high traveling velocities. Since the influence of the wind load only clearly becomes manifest at relatively high velocities, the energy model can be simplified markedly with the aid of this measure.

In accordance with a further embodiment, the control device is designed to reduce the wiping frequency in the event of an increase in the traveling velocity and an increase, associated therewith, in the wind load acting on the wiper arm in such a way that, as a result, the additional energy input brought about by the increase in wind load in the drive unit is substantially compensated for. This measure makes it possible to achieve a situation in which the wiper operation is always taking place in a desired operating region without a critical load threshold for the total load being exceeded and a thermal protective function being activated.

In addition, a further embodiment envisages that the control device is designed to automatically reduce the wiping frequency as soon as a predetermined traveling velocity is exceeded. Targeted selection of the velocity threshold can ensure that the wiper operation always takes place in a desired operating region, despite quadratically increasing wind load. As a result, energy management can be realized with very little complexity which takes into consideration the increase in the total load which is dependent on the traveling velocity.

A further embodiment envisages that the control device is designed to determine the load variable on the basis of a model which simulates the present load state of the drive unit on the basis of empirical values, physical rules and/or determined reference values. In this case, the control device further is designed to reduce the wiping frequency when the load variable determined in the process exceeds a predetermined load threshold value. With the aid of such a model, it is possible to draw a very precise conclusion on the present load state of the wiper motor. In addition, it is also possible for the individual load variables of the wiper motor to be derived from the model, even those which are not accessible or are only accessible with difficulty through direct measurement.

A further embodiment envisages that the control device is designed to switch over to an interval operating mode with freely parameterizable interval cycles in order to reduce a thermal load on the drive unit caused by continuous wiping operations. The interval operation makes it possible to produce the energy input in the wiper motor without needing to set the wiper operation. The free parameterizability of the interval cycles makes it possible to vary the average energy input over a wide range.

According to a further embodiment, the control device is designed to reduce the wiping frequency to zero in order to reduce a thermal load on the drive unit caused by the wiping action and to resume the wiping action only as a result of a user input or an item of information from the vehicle electrical system. By automatically setting the wiping action, the activation of the thermal protective function can be effectively prevented. This is in particular the case when the wiping frequency cannot be reduced any further or when such a reduction is not expedient. The resumption of the wiping action by a user input or an item of information from the vehicle electrical system ensures that the wiping action is available if required.

Finally, in accordance with a further embodiment, the control device is designed to detect, on the basis of the ratio of at least one load variable to a load threshold value, whether a wiping operation is taking place on a dry or on a wet windshield. In addition, the control device is also designed to reduce the wiping frequency in the case of a dry windshield to such an extent that the thermal load on the drive unit remains below a predetermined threshold value, above which a thermal protection mechanism of the drive unit is triggered. Precisely during wiping on a dry windshield and in the case of the associated high load state of the drive motor, there is the risk of the drive motor drifting thermally and of a thermal protective function being activated. By comparing the load variable with the load threshold value, the wiping operation taking place on a dry windshield can be clearly identified. By reducing the wiping frequency, the operation on the dry windshield can be maintained without activation of the thermal protective function.

BRIEF DESCRIPTION OF THE DRAWINGS

The invention will be explained in more detail below with reference to drawings, in which.

DETAILED DESCRIPTION

Figure 1:
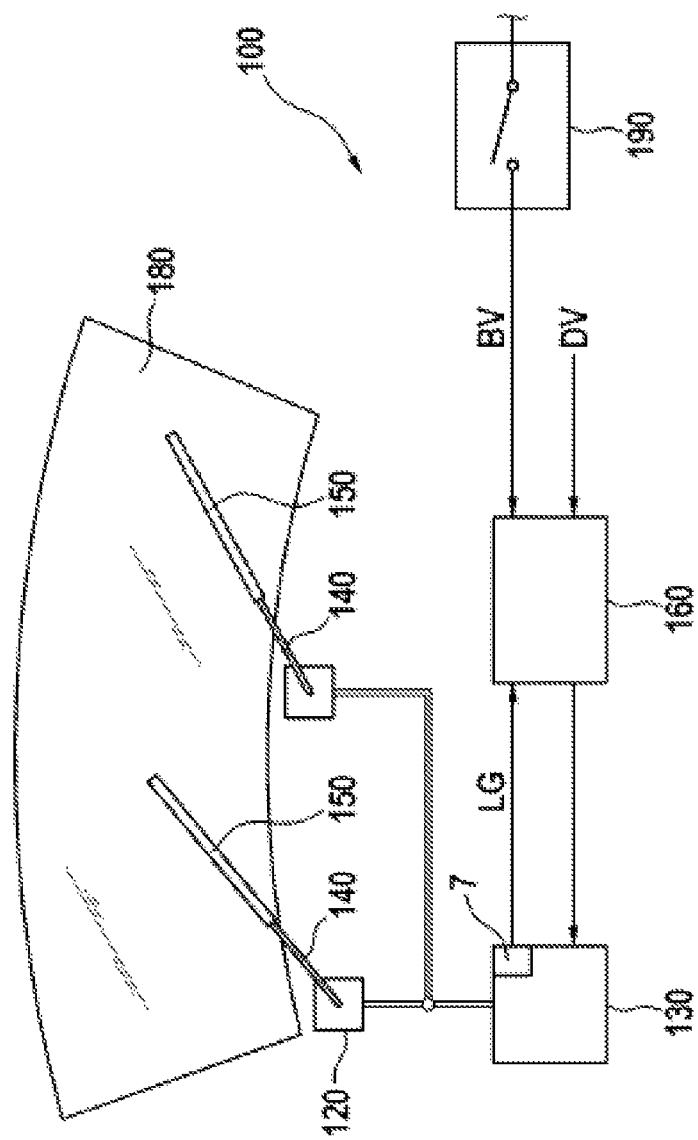
FIG. 1 shows a block diagram of a wiper system with a control device in accordance with the invention.

FIG. 1 shows, by way of example, a windshield wiper system 100, as is typically used on a front windshield of a motor vehicle. The windshield wiper system 100 comprises two wiping arms 140, which each rest with a wiper blade 150 fixed thereto, on the windshield 180 to be cleaned. The wiper arm pair 140 is often driven by a common drive unit 120, with each wiper arm 140 having a dedicated drive unit 120 in the present example. A typical drive unit 120 can comprise a rotary motor or a reversing wiper motor, which is coupled directly or via a suitable transmission (not shown here) to the respective wiper arm 140. During operation, the drive unit 120 drives the associated wiper arm 140 in such a way that the wiper blade 150 wipes over the surface of the windshield 180 and in the process removes moisture and other deposits from the windshield surface.

In order to control each drive unit 120, the windshield wiper system 100 comprises a control unit 160 and a driver unit 130 connected downstream of the control unit 160. The control unit 160 predetermines how often and at what speed the wiper arms 140 are moved over the windshield 180. This is generally performed by means of a manipulated variable, which the control unit 160 provides to the driver unit 130. The driver unit 130 converts this manipulated variable into a corresponding drive variable for the drive units 120, for example one or more voltages or voltage pulses which generate the desired drive torque or the desired rotation speed in the drive unit 120. The driving of the drive unit 120 is performed with the aid of pulse-width modulated signals, for example. Alternatively, a wiping frequency can also be predetermined as manipulated variable, with the driver unit 130 determining the corresponding drive variables for the respective drive unit 120 from said wiping frequency in order to drive said drive unit such that the wiper arm 140 is operated at the predetermined wiping frequency WH.

Generally, the control unit 160 determines the manipulated variable for the desired operating state on the basis of specific input values, such as, for example, a user input value BV input via a steering column switch 190 or a detector input value DV, for example from a rain sensor.

The manipulated variable of the control unit 160 predetermines the functioning of the windshield wiper system 100 and therefore directly determines the present wiping frequency WH. The wiping frequency WH generally corresponds to the number of wiping cycles per unit time. It can be determined firstly by the duration of the individual wiping cycles and therefore by the speed of the wiper arm 140. Secondly, the wiping frequency WH can also be determined by the wiping interval, i.e. by the interruption time between two wiping cycles in which the wiper arm remains in a rest position.

According to the invention, the control apparatus 160 is designed to set the wiping frequency WH depending on a load threshold value LS. For this purpose, a load variable L of the wiper motor 120 is determined and compared with a predetermined load threshold value LS. The setting of the wiping frequency then takes place depending on the ratio of the load variable L to the load threshold value. In particular, the wiping frequency WH is reduced when the predetermined load threshold value LS is exceeded in order to limit or reduce the energy input in the wiper motor 120 and the thermal loading associated therewith. Firstly, this can be performed continuously, with the reduction in the wiping frequency being greater the higher the loading on the wiper motor 120 or the higher the traveling velocity v. Secondly, the wiping frequency reduction can also take place suddenly by virtue of the wiping frequency WH being reduced by a certain magnitude only once a predetermined threshold value is exceeded.

In principle, all suitable parameters of the wiper motor 120 are possible load variables. For example, the torque to be applied by the wiper motor 120 can be used as load variable L. In addition, the loading on the motor 120 can be determined, for example, on the basis of the winding temperature T, the current flowing through the motor winding, the clamping voltage of the motor or the instantaneous rotation speed of the motor. In general, the load variable L describes how difficult it is for the wiper arm 140 to move over the surface of the windshield 180, while the loading describes the amount of energy which needs to be applied by the wiper motor 120 and consequently also arises there. It is also possible to implement the control of the wiping frequency WH directly on the basis of the traveling velocity v. In this case, the velocity of the vehicle quasi represents an indirect load variable of the wiper motor 120, while the wind load acting on the wiper arm 140 represents a direct load variable of the wiper motor 120. The load variable L can in this case be determined, for example, by direct measurement, for example by means of a sensor or detector, by derivation from other variables or parameters, or else from a calculation performed on the basis of a model. Thus, the torque of the wiper motor 120 can be detected, for example with the aid of a load detector 170 arranged in the driver unit 130, and provided to the control apparatus 160 as an information item.

Figure 3:
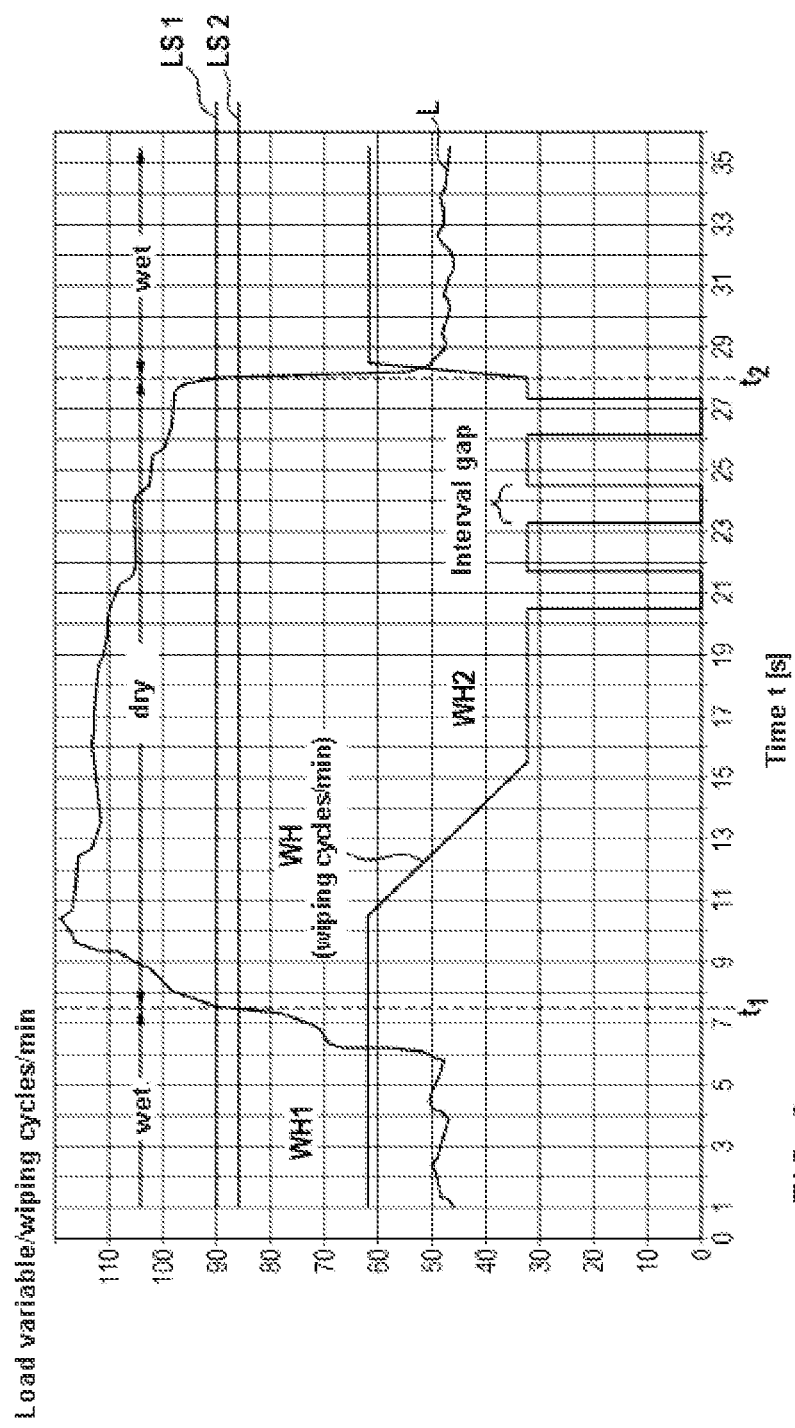
FIG. 3 shows a timing diagram illustrating the motor load and the wiping frequency for illustrating the response model of the energy management of the control device according to the invention.

FIG. 3 shows, by way of example, a response model of the energy management according to the invention at a specific vehicle velocity v and with the load threshold values LS1, LS2 defined there. In principle, the response model shown here and the load thresholds LS1, LS2 on the basis of this model can change depending on the traveling velocity v. In particular, the load thresholds LS1, LS2 can increase with the traveling velocity. However, further parameters of the response model, such as, for example, the magnitude by which the wiping frequency WH is reduced, the duration in which the wiper motor continues to be operated in the event of a pending reduction in the wiping frequency, initially at the presently set wiping frequency WH1, WH2, or the time in which a change from a first to a second wiping frequency WH1, WH2 takes place, can also turn out differently depending on the traveling velocity v.

FIG. 3 illustrates the response of the energy management in the event of a change to the wetting state of the windshield 180 to be cleaned. As is shown in the left-hand region of the graph, the wiper operation first takes place on a wet windshield with a predetermined first wiping frequency WH1 of approximately 62 wiping cycles/minute. The determined load variable L, for example the torque to be applied by the wiper motor 120, is markedly below a predetermined first load threshold value LS1 owing to the moist windshield. The wiping operation conventionally takes place under these conditions, i.e. in the normal operating mode. As soon as the rain stops, as takes place after approximately the sixth second here, the wiping operation now takes place on a dry windshield. As a result, the load variable L increases markedly and in this case exceeds the load threshold value LS1 at time t1. Owing to the high motor load, there is the risk of the wiper motor 120 drifting away thermally and the thermal protective function being activated. In order to prevent this, after this point in time the energy model mode according to the invention is activated, in which an attempt is made, by a targeted reduction of the wiping frequency WH, to limit the thermal loading on the wiper motor 21 and to squeeze this down to a lower level. For this purpose, the first wiping frequency WH1 set is reduced to a lower second wiping frequency WH2. Depending on the level of the present motor load, the control device 160 can decide whether and for how long the wiping operation is initially still continued at the first wiping frequency WH1. In addition, a decision is made as to how quickly the reduction in the wiping frequency WH should take place. In the present exemplary embodiment, the wiping operation is continued for a time period of approximately 3 seconds at the original wiping frequency WH1 and only after this is the wiping frequency reduced, continuously over a time period of approximately 5 seconds, to the lower wiping frequency WH2 of approximately 32 wiping cycles/minute. In this time period, the wiper motor 120 is already relieved of load, thus resulting in a noticeable reduction in the load variable L. In order to achieve further load relief on the motor, after a further 5 seconds, for example, the system is switched over to an interval operation with freely parameterizable interval cycles. As a result, the load variable L decreases further.

It can also be seen from the graph that after approximately the $28^{th}$ second the determined load variable L decreases again owing to renewed wetting of the windshield, for example as a result of sudden rainfall. The load variable L in this case falls below a second load threshold LS2, which is slightly below the first load threshold LS1, at a time $t_2$, as a result of which the change from the energy model mode to the normal operating mode is initiated. As a result, the wiping frequency WH increases again to the originally set value WH1. The rise in the wiping frequency preferably takes place suddenly in order to produce optimum visibility as quickly as possible again in the event of rainfall. However, the rise in the wiping frequency can also take place over a parameterizable time period, in particular when the intensity of the rainfall is only low.

Against the background of the approach in which a vehicle windshield which is only wet with moisture is intended to be cleaned using the windshield wiper system 100, a reset strategy right up to interval wiping on the dry windshield can be realized which reverses back to the original state directly after wetting of the windshield.

The wiping frequency WH can be reduced according to the invention by virtue of initially the wiping speed being reduced to a minimum value and, if a further reduction is required, then wiping intervals being introduced between the individual wiping cycles. In the interval operating mode, the interval gaps can be freely parameterized, as a result of which a continuous reduction in the wiping frequency WH up to complete standstill can take place. The interval operating mode can be expedient in particular when, in order to reduce the load on the drive unit, the wiping speed can not be reduced any further without rattling of the wiper blade 150 on the windshield surface occurring. Correspondingly, the wiping frequency WH can be increased again by first the individual wiping intervals being reduced and then, once the wiping intervals have been reduced to zero, the wiping speed being increased again. However, it is also possible for the wiping speed and the wiping intervals to be varied independently of one another in order to set a desired wiping frequency WH.

Figure 2:
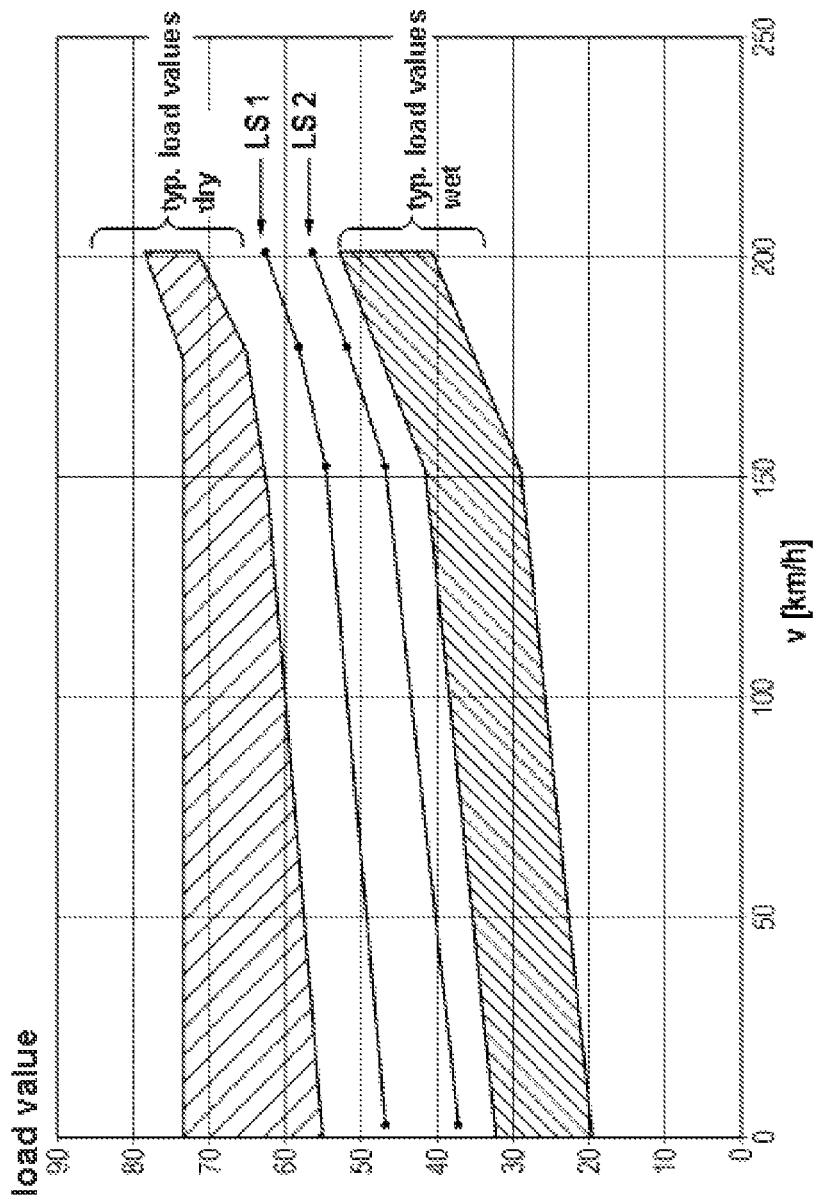
FIG. 2 shows a graph illustrating the influence of the traveling velocity on the motor load.

The graph illustrated in FIG. 2 shows the loads acting on the wiper arm 140 in the wiping operating mode on a wet and a dry windshield at different traveling velocities. In this case, it is first apparent that the typical load values during wiping on a wet windshield are markedly below the typical load values for wiping on a dry windshield owing to the friction, which is reduced by the moisture, between the wiper blade and the windshield, with the considerable friction in the case of wiping on a dry windshield requiring high torques. In addition, it can be seen that the load values increase as the velocity v increases both on the dry windshield and on the wet windshield. The gradient of the load value curve at the relatively high velocities is in this case markedly greater than at relatively low velocities, since the velocity v, squared, is included in the load on the wiper arm. It can also be seen from FIG. 2 that the load thresholds LS1, LS2 used as the basis for the control device 120 to implement matching of the wiping frequency WH likewise increase with the velocity v. As is shown in the present exemplary embodiment, the load thresholds LS1, LS2 can be parameterized at sampling points depending on the traveling velocity.

Figure 4:
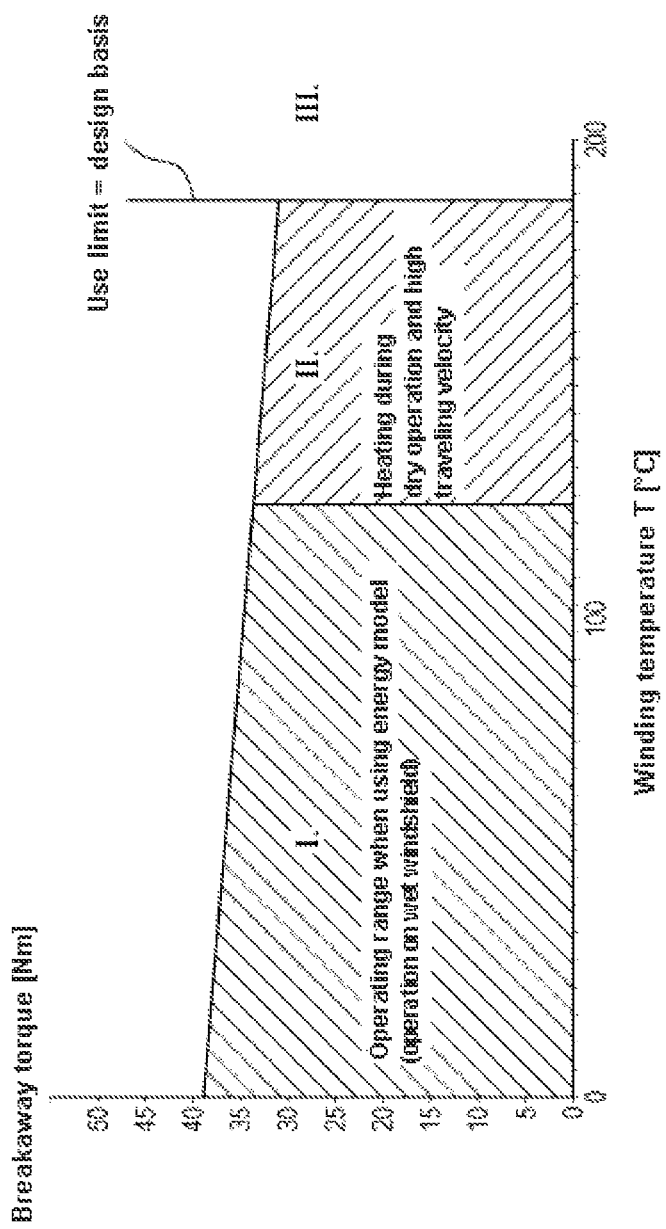
FIG. 4 shows a graph illustrating the maximum available motor torque depending on thermal heating of the drive unit.

FIG. 4 shows a graph which, in very simplified form, describes the relationship between the maximum available motor torque and the thermal heating of the motor components. In this case, in particular the reduction in the breakaway torque which is brought about by the temperature increase in the motor interior is shown. The decrease in torque can primarily be attributed to the thermally induced rise in the resistance of the motor windings. However, a thermally induced decrease in the magnetic flux in the armature also results in a considerable reduction in the breakaway torque. In particular at high temperatures, these effects are responsible for considerably decreased efficiency of the drive unit. FIG. 4 shows a first and a second operating region I, II of the wiper motor. The first operating region I in this case substantially corresponds to the operation on a wet windshield, which is characterized by a relatively low winding temperature T. In this region, the wiper motor remains thermally stable owing to the relatively low loading and can therefore provide a high maximum breakaway torque. In contrast, the second operating region II, which substantially corresponds to the operation on a dry windshield at a high traveling velocity, is characterized by a high winding temperature T and a correspondingly reduced breakaway torque. In this region, II, there is the risk of the wiper motor drifting away thermally owing to the relatively high energy input, with the result that the winding temperature exceeds the use limit and, as a result, defects in the motor winding occur. In order to prevent the wiper motor from drifting into a third region III beyond the use limit, thermal protective functions are generally provided which initiate shutdown of the wiper motor shortly before the use limit is reached.

Since the wiper motor remains thermally stable in the first operating region I, while the winding temperature T in the second operating region increases tendentially, the transition between the two operating regions I, II represents a thermal stability limit. The aim of the present invention is to ensure that the drive motor is operated as far as possible in the first operating region I with the aid of the concept described here.

Figure 5:
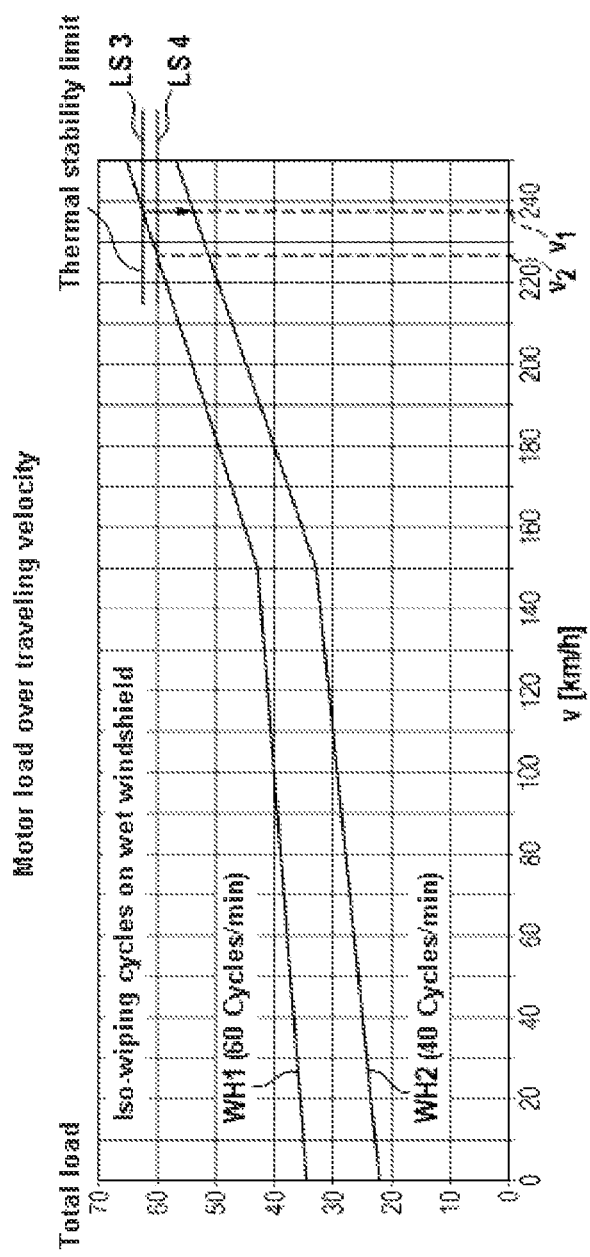
FIG. 5 shows the load profile on a wet front windshield at different traveling velocities.

A velocity-dependent reduction in the wiping frequency WH owing to limitation of the energy input in the wiper motor 120 can in principle also take place automatically without needing to resort to load variables L of the wiper motor for this purpose. For example, the wiping frequency WH can be reduced automatically by a predetermined magnitude above a predetermined traveling velocity $v_1$. The corresponding traveling velocity $v_1$ can in this case be present in the form of an item of information which has already been determined in advance on the basis of measurements, empirical values and/or calculations and is stored in a storage device of the control device. The advantage here is that an extension of the use limits of the wiper motor can thus also be realized without knowledge of the individual load variables or the total load on the wiper motor. Since in this case the determination of the load state of the wiper motor by measurement or calculation of individual load variables is not necessary, a particularly simple and nevertheless effective energy management can thus be realized. This energy management will be described in more detail below with reference to FIG. 5. In this case, the graph shown here illustrates the relationship between the motor load on a wet front windshield and the velocity v of the vehicle. The upper curve shows the load profile during wiping in the continuous operating mode with a first wiping frequency WH1 (60 cycles per minute) while the lower curve corresponds to a wiping operation with a lower second wiping frequency (40 cycles per minute). As is shown here, the total load increases overproportionally with the increase in traveling velocity owing to the aerodynamic effects. At a limit velocity $v_1$ of approximately 237 km/h, the upper curve reaches a predetermined load threshold LS3. The load threshold LS3 which is obtained, for example, on the basis of empirical values can mark the thermal stability limit of the wiper motor, for example. The simplified energy management can reduce the set wiping frequency WH1 when the limit velocity $v_1$ is reached automatically to the lower wiping frequency WH2 in order to prevent this thermal stability limit from being exceeded and therefore to prevent operation of the wiper motor in a thermally unstable operating region. As is shown in FIG. 5, the load sum of the wiper motor at the lower wiping frequency WH2 has a lower value markedly below the load threshold LS3. With the reduction in the wiping frequency, the energy input and therefore also the thermal loading on the wiper motor can thus be markedly reduced.

As soon as the traveling velocity v falls below the limit velocity $v_1$ again, the wiping frequency can be increased from the low wiping frequency WH2 back to the originally set wiping frequency WH1. In order to ensure stable response of this switching concept, switching hysteresis can be provided. In this case, the change from the low wiping frequency WH2 to the higher wiping frequency WH1 takes place only once the velocity has fallen below a second limit velocity $v_2$, which is lower than the first limit velocity and which defines a second load threshold value LS4. Depending on the application, it is also possible for a plurality of limit velocities to be predetermined, wherein the wiping frequency is reduced automatically by a predetermined magnitude when said limit velocities are exceeded. With the aid of the automatic reduction in the wiping frequency WH when a predetermined traveling velocity is exceeded, it is possible to prevent thermal overload of the motor 120 quasi-predictively.

The two load thresholds LS3, LS4 describe the limit load which is applicable for an exemplary wiper motor and which is avoided as far as possible in order to output the required power in a thermally stable fashion. In order not to exceed the limit LS3, the wiping frequency can be changed in step 2 in freely parameterizable fashion depending on the vehicle velocity and/or taking into consideration the thermal state, for example.

Although the energy management triggered with the aid of a limit velocity and described in connection with FIG. 5 manages without any load variable determination and without the use of the energy model, it is in principle possible to use both procedures simultaneously in a common energy management concept. The reduction in the wiping frequency WH then takes place both automatically using a predetermined traveling velocity $v_1$ and using a determined load variable L. For example, the wiping frequency WH can be set initially on the basis of a comparison of the determined load variable L with a predetermined load threshold value LS to a corresponding wiping frequency and can be reduced automatically to a predetermined wiping frequency independently of the determined load variable L when a predetermined traveling velocity $v_1$ is exceeded.

As is explained on the basis of the preceding exemplary embodiments, the inventive concept envisages various measures for reducing the thermal loading on the wiper motor which can be realized both individually on their own and in combination with one another. These measures include:

parameterization of the load thresholds LS depending on the traveling velocity in order to go into their dynamic effects during wiper arm loading;

providing different load thresholds which are parameterized primarily at high traveling velocities, with the result that in particular the wiping frequency in step 2 is scaled back variably after a certain time and/or given a determined wiper motor temperature in freely programmable fashion in order that the wiper motor is thermally stabilized or a wiping frequency which is as high as possible is provided without thermal protection mechanisms becoming effective;

supplementing the parameterizable wiping frequency in the event of load thresholds being exceeded or undershot with an interval operating mode with changing/freely parameterizable interval cycles;

introducing further load thresholds within the operation in the energy model mode, with the aid of which it is possible to decide whether and for how long the desired wiping frequencies or interval cycle durations should remain;

changing the wiping frequency when the load threshold LS2 is undershot in order to continuously increase the wiping frequency; and reducing the wiping frequency to zero, with the result that the wiping operation can be resumed again only when the steering column switch is actuated or an information item from the vehicle electrical system is present indicating that wetting of the windshield is expected.

What is claimed is:

1. A control device (160) for controlling a drive unit (120) for at least one wiper arm (140) of a vehicle windshield wiper system (100), the control device (160) being designed to determine at least one load variable (L) of the drive unit (120) and to set the wiping frequency (WH) of the wiper arm (140) on the basis of a ratio of the determined load variable (L) to at least one load threshold value (LS), characterized in that the control device (160) is designed to perform the setting of the wiping frequency (WH) depending on a present traveling velocity (v) of the vehicle; wherein the control device (160) is configured to determine the load threshold value (LS) depending on a wind load acting on the wiper arm (140) at the present traveling velocity (v).

2. The control device (160) as claimed in claim 1, characterized in that the control device (160) is designed to increase the load threshold value (LS1, LS2), in the event of an increase in the traveling velocity (v), by a magnitude which corresponds substantially to an increase in a wind load acting on the wiper arm (140) brought about by the increase in traveling velocity.

3. The control device (160) as claimed in claim 1, characterized in that the control device (160) is designed to implement the velocity-dependent matching of the load threshold value (LS) only at relatively high traveling velocities (v).

4. The control device (160) as claimed in claim 1, characterized in that the control device (160) is designed to reduce the wiping frequency (WH) in the event of an increase in the traveling velocity (v) and an increase, associated therewith, in the wind load acting on the wiper arm (140) in such a way that, as a result, the additional energy input brought about by the increase in wind load in the drive unit (120) is substantially compensated for.

5. The control device (160) as claimed in claim 1, characterized in that the control device (160) is designed to automatically reduce the wiping frequency (WH) as soon as a predetermined traveling velocity (v1) is exceeded.

6. The control device (160) as claimed in claim 1, characterized in that the control device (160) is designed to switch over to an interval operating mode with freely parameterizable interval cycles in order to reduce a thermal load on the drive unit (120) caused by continuous wiping operations.

7. The control device (160) as claimed in claim 1, characterized in that the control device (160) is designed to reduce the wiping frequency (WH) to zero in order to reduce a thermal load on the drive unit (120) caused by the wiping action and to resume the wiping action as a result of a user input.

8. The control device as claimed in claim 1, characterized in that the control device (160) is designed to detect, on the basis of a ratio of at least one load variable (L) to a load threshold value (LS), whether a wiping operation is taking place on a dry or on a wet windshield, and in that the control device (160) is also designed to reduce the wiping frequency (WH) in the case of a dry windshield to such an extent that the thermal load on the drive unit (120) remains below a threshold value, above which a thermal protection mechanism of the drive unit (120) is triggered.

9. The control device (160) as claimed in claim 1, characterized in that the control device (160) is designed to reduce the wiping frequency (WH) to zero in order to reduce a thermal load on the drive unit (120) caused by the wiping action and to resume the wiping action as a result of an item of information from the vehicle electrical system.

10. A windshield wiper system (100) for a vehicle comprising a drive unit (120) for at least one wiper arm (140) and a control device (160) for the drive unit (120), the control device (160) being designed to determine at least one load variable (L) of the drive unit (120) and to set a wiping frequency (WH) of the wiper arm (140) on the basis of a ratio of the determined load variable (L) to at least one load threshold value (LS), characterized in that the control device (160) is designed to perform the setting of the wiping frequency (WH) depending on a present traveling velocity (v) of the vehicle.

11. A method for controlling a drive unit (120) of a windshield wiper system (100) of a vehicle having at least one wiper arm (140), at least one load variable (L) of the drive unit (120) being determined, and a wiping frequency (WH) of the wiper arm (140) being set on a basis of a ratio of the determined load variable (L) to at least one load threshold value (LS), characterized in that the setting of the wiping frequency (WH) takes place depending on a present traveling velocity (v) of the vehicle; wherein the load threshold (LS) is determined depending on the traveling velocity (v).

12. The method as claimed in claim 11, characterized in that the wiping frequency (WH) is reduced automatically when a predetermined traveling velocity ($v_1$) is exceeded.

\* \* \* \* \*